United States Patent
Yoda et al.

(10) Patent No.: US 8,245,497 B2
(45) Date of Patent: Aug. 21, 2012

(54) EXHAUST EMISSION CONTROL DEVICE FOR INTERNAL COMBUSTION ENGINE AND PERFORMANCE DIAGNOSIS METHOD FOR NOX ADSORBENT

(75) Inventors: Kimikazu Yoda, Susono (JP); Takaaki Itou, Mishima (JP); Keisuke Sano, Susono (JP); Kazuhiro Wakao, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 466 days.

(21) Appl. No.: 12/594,865

(22) PCT Filed: Mar. 21, 2008

(86) PCT No.: PCT/JP2008/055208
§ 371 (c)(1),
(2), (4) Date: Oct. 6, 2009

(87) PCT Pub. No.: WO2008/132898
PCT Pub. Date: Nov. 6, 2008

(65) Prior Publication Data
US 2010/0115919 A1     May 13, 2010

(30) Foreign Application Priority Data
Apr. 13, 2007  (JP) ................... 2007-106154

(51) Int. Cl.
*F01N 3/00* (2006.01)
*F01N 3/10* (2006.01)
(52) U.S. Cl. ................. 60/277; 60/276; 60/301

(58) Field of Classification Search .............. 60/274, 60/276, 277, 295, 301
See application file for complete search history.

(56) References Cited

U.S. PATENT DOCUMENTS

| 5,158,582 | A  | * | 10/1992 | Onitsuka et al. ............. 95/129 |
| 2002/0053199 | A1 | * | 5/2002 | Sato et al. ..................... 60/277 |
| 2003/0046924 | A1 | * | 3/2003 | Iihoshi et al. ................ 60/277 |

FOREIGN PATENT DOCUMENTS

| JP | 2000-345832 | 12/2000 |
| JP | 2002-70539 | 3/2002 |
| JP | 2003-148135 | 5/2003 |
| JP | 2004-68665 | 3/2004 |

* cited by examiner

*Primary Examiner* — Thomas Denion
*Assistant Examiner* — Audrey K Bradley
(74) *Attorney, Agent, or Firm* — Finnegan, Henderson, Farabow, Garrett & Dunner, LLP

(57) ABSTRACT

The present invention relates to an exhaust emission control device having an NOx adsorbent, and makes it possible to judge whether the performance of the NOx adsorbent is degraded temporarily or permanently. The amounts of NOx and water adsorbed by the NOx adsorbent are measured during an actual operation of an internal combustion engine. A reference line indicating the correlation between a preselected water adsorption amount and NOx adsorption amount is then referenced to determine a reference value y0 of the NOx adsorption amount that corresponds to a measured value x1 of the water adsorption amount. Next, a measured value y1 of the NOx adsorption amount is compared against the reference value y0 to output a signal in which the result of the comparison is reflected.

9 Claims, 4 Drawing Sheets

EXHAUST EMISSION CONTROL DEVICE FOR INTERNAL COMBUSTION ENGINE AND PERFORMANCE DIAGNOSIS METHOD FOR NOX ADSORBENT

CROSS-REFERENCE TO RELATED APPLICATIONS

This application is a national phase application of International Application No. PCT/JP2008/055208, filed Mar. 21, 2008, and claims the priority of Japanese Application No. 2007-106154, filed Apr. 13, 2007, the contents of both of which are incorporated herein by reference.

TECHNICAL FIELD

The present invention relates to an exhaust emission control device for an internal combustion engine and, more specifically, to an exhaust emission control device having an NOx adsorbent that is capable of adsorbing NOx in exhaust gas at a low temperature.

BACKGROUND ART

An exhaust emission control device disclosed, for instance, in Patent Document 1 (JP-A-2000-345832) includes an NOx adsorbent in addition to a catalyst. The catalyst cannot thoroughly purify NOx on a cold start-up because its activity is low at a low temperature. However, when the exhaust emission control device includes an NOx adsorbent that is capable of adsorbing NOx even at a low temperature, it is possible to prevent NOx from being emitted into the atmosphere.

DISCLOSURE OF THE INVENTION

Problem to be Solved by the Invention

It is known that the adsorption performance of an NOx adsorbent gradually degrades through use. The adsorption performance degrades partly because an adsorptive material deteriorates due, for instance, to NOx adsorption site extinction. After the adsorption performance has degraded due to the deterioration of an adsorptive material, it cannot be restored. However, experiments have revealed that the degraded adsorption performance can be partly restored by exposing the NOx adsorbent to a reductive atmosphere. It is estimated that a recoverable decrease in the adsorption performance may occur when a chemical compound is formed due the reaction of a part of an NOx adsorption site or a metal at an ion exchange site at which the NOx adsorption site is formed. As the chemical compound can be regenerated by exposing it to a reductive atmosphere, it is conceivable that the reaction may be oxidation.

In any case, a decrease in the adsorption performance of the NOx adsorbent can be classified into permanent performance degradation and temporary performance degradation. To make effective use of the NOx adsorbent, it would be necessary to properly judge whether permanent or temporary performance degradation is encountered, and perform an appropriate process in accordance with the cause of performance degradation. If temporary performance degradation is encountered, the performance can be restored by exposing the NOx adsorbent to a reductive atmosphere. However, the time and energy required to perform a restoration process vary with the degree of performance degradation. To properly perform the restoration process, it would be necessary to objectively evaluate the degree of adsorption performance degradation.

The present invention has been made to solve the above problem. A first object of the present invention is to provide a method of judging whether the performance of the NOx adsorbent is degraded temporarily or permanently. A second object of the present invention is to provide a method of objectively evaluating the degree of temporary performance degradation of the NOx adsorbent.

Means for Solving the Problems

In order to attain at least one of the objects described above, a first aspect of the present invention is an exhaust emission control device for an internal combustion engine, the device comprising:

an NOx adsorbent which is positioned in an exhaust path of the internal combustion engine;

NOx adsorption amount measurement means for measuring the amount of NOx that is adsorbed by the NOx adsorbent while the internal combustion engine is in operation;

water adsorption amount measurement means for measuring the amount of water that is adsorbed by the NOx adsorbent while the internal combustion engine is in operation;

reference value storage means for storing a reference value of an NOx adsorption amount with respect to a water adsorption amount;

comparison means for comparing a measured NOx adsorption amount against a reference value of the NOx adsorption amount with respect to a measured water adsorption amount; and signal output means for outputting a signal in which the result of the comparison is reflected.

A second aspect of the present invention is the exhaust emission control device according to the first aspect of the present invention, wherein the signal output means outputs a signal representing the magnitude relationship between the measured value of the NOx adsorption amount and the reference value of the NOx adsorption amount that have been compared.

A third aspect of the present invention is the exhaust emission control device according to the first aspect of the present invention, wherein the signal output means outputs a signal corresponding to the deviation between the measured value of the NOx adsorption amount and the reference value of the NOx adsorption amount that have been compared.

A fourth aspect of the present invention is the exhaust emission control device according to the first aspect of the present invention, wherein the signal output means outputs not only a signal corresponding to the deviation between the measured value of the NOx adsorption amount and the reference value of the NOx adsorption amount that have been compared, but also a signal corresponding to the measured value of the water adsorption amount.

A fifth aspect of the present invention is the exhaust emission control device according to any one of the first to the fourth aspects of the present invention, wherein the NOx adsorption amount measurement means includes an upstream NOx sensor, which is positioned upstream of the NOx adsorbent, and a downstream NOx sensor, which is positioned downstream of or within the NOx adsorbent, and calculates the NOx adsorption amount in accordance with the output value difference between the two NOx sensors.

A sixth aspect of the present invention is the exhaust emission control device according to any one of the first to the fifth aspects of the present invention, wherein the water adsorption amount measurement means includes an upstream water sensor, which is positioned upstream of the NOx adsorbent, and a downstream water sensor, which is positioned downstream of or within the NOx adsorbent, and calculates the water adsorption amount in accordance with the output value difference between the two water sensors.

A seventh aspect of the present invention is the exhaust emission control device according to any one of the first to the fifth aspects of the present invention, wherein the water adsorption amount measurement means includes an upstream temperature sensor, which is positioned upstream of the NOx adsorbent, and a downstream temperature sensor, which is positioned downstream of or within the NOx adsorbent, and calculates the water adsorption amount in accordance with the output value difference between the two temperature sensors.

Further, An eighth aspect of the present invention is a performance diagnosis method for an NOx adsorbent, comprising the steps of:

preparing data representing the correlation between the water adsorption amount and NOx adsorption amount of an NOx adsorbent (hereinafter referred to as the reference body) whose NOx adsorption performance is not temporarily degraded;

supplying a gas containing NOx and water to an NOx adsorbent, which is a diagnosis target (hereinafter referred to as the diagnosis target body), and measuring the amounts of NOx and water adsorbed by the diagnosis target body;

referencing the data to determine the NOx adsorption amount of the reference body (hereinafter referred to as the reference NOx adsorption amount) that corresponds to a measured water adsorption amount, and comparing a measured NOx adsorption amount against the reference NOx adsorption amount; and judging the degree of temporary NOx adsorption performance degradation of the diagnosis target body in accordance with the result of the comparison.

ADVANTAGES OF THE INVENTION

Experiments conducted by the applicant of the present invention have revealed that there is a high correlation between a water adsorption amount and an NOx adsorption amount when the performance of an NOx adsorbent is not temporarily degraded (not degraded presumably due to oxidation). If the adsorption performance is permanently degraded due to deterioration, the NOx adsorption amount and the water adsorption amount both decrease while maintaining the above-mentioned correlation. If, on the other hand, the performance of the NOx adsorbent is temporarily degraded, the experiments indicate that only the performance of NOx adsorption degrades while the performance of water adsorption remains unaffected. These new findings indicate that whether the performance of the NOx adsorbent is degraded temporarily or permanently can be determined by checking whether the above-mentioned correlation persists between the water adsorption amount and the NOx adsorption amount.

In the first aspect of the present invention, a measured NOx adsorption amount is compared against a reference NOx adsorption amount corresponding to a measured water adsorption amount. If the adsorption performance of the NOx adsorbent is not degraded or is degraded permanently due to deterioration, the measured NOx adsorption amount is substantially equal to the reference NOx adsorption amount. However, if the performance of the NOx adsorbent is temporarily degraded, the measured NOx adsorption amount deviates from the reference NOx adsorption amount. A signal generated by the first aspect of the present invention represents the result of the above comparison. Therefore, referencing the signal makes it possible to properly detect whether the performance of the NOx adsorbent is degraded temporarily or permanently.

A signal generated in the second aspect of the present invention represents the magnitude relationship between the measured NOx adsorption amount and the reference NOx adsorption amount. Therefore, referencing the signal makes it possible to accurately judge whether the performance of the NOx adsorbent is temporarily degraded.

A signal generated in the third aspect of the present invention represents the deviation between the measured NOx adsorption amount and the reference NOx adsorption amount. Therefore, referencing the signal makes it possible to objectively evaluate the degree of temporary performance degradation of the NOx adsorbent.

The fourth aspect of the present invention generates not only a signal representing the deviation between the measured NOx adsorption amount and the reference NOx adsorption amount, but also a signal representing the measured water adsorption amount. This makes it possible to evaluate the degree of temporary performance degradation of the NOx adsorbent in consideration of NOx adsorbent deterioration.

In the fifth aspect of the present invention, the NOx adsorption amount of the NOx adsorbent can be accurately measured in accordance with values measured by NOx sensors.

In the sixth aspect of the present invention, the water adsorption amount of the NOx adsorbent can be accurately measured in accordance with values measured by water sensors.

In the seventh aspect of the present invention, the water adsorption amount of the NOx adsorbent, which is highly correlated to adsorption heat, can be indirectly measured by allowing temperature sensors to measure a temperature rise in the NOx adsorbent due to adsorption heat.

In the eighth aspect of the present invention, the amount of NOx adsorbed by a diagnosis target body (NOx adsorbent) is compared against a reference NOx adsorption amount corresponding to a prevailing water adsorption amount. Further, the degree of temporary NOx adsorption performance degradation of the diagnosis target body is judged in accordance with the result of comparison. If the adsorption performance of the diagnosis target body is not degraded or is degraded permanently due to deterioration, the measured NOx adsorption amount of the diagnosis target body is substantially equal to the reference NOx adsorption amount. However, if the performance of the diagnosis target body is temporarily degraded, the measured NOx adsorption amount deviates from the reference NOx adsorption amount. Therefore, the comparison between the measured NOx adsorption amount and the reference NOx adsorption amount can be used to properly detect whether the performance degradation of the diagnosis target body is temporary or permanent. In addition, it is possible to objectively evaluate the degree of temporary NOx adsorption performance degradation of the diagnosis target body.

Figure 1:
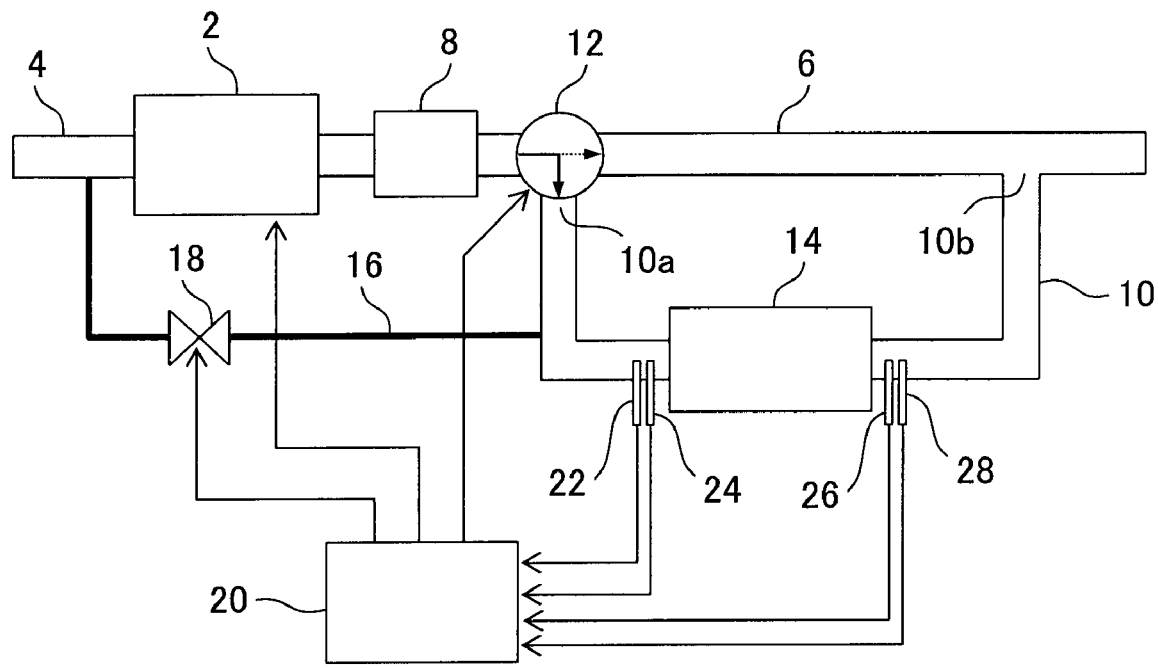
FIG. 1 is a schematic diagram illustrating the configuration of an internal combustion engine system that includes an exhaust emission control device according to a first embodiment of the present invention.

DESCRIPTION OF NOTATIONS 2 internal combustion engine
4 intake path
6 exhaust path
8 catalyst
10 bypass
10a upstream joint
10b downstream joint
12 changeover valve
14 NOx adsorbent
16 return path
18 purge control valve
20 ECU
22,26 water sensor
24,28 NOx sensor
30,32 temperature sensor

BEST MODE FOR CARRYING OUT THE INVENTION

First Embodiment

A first embodiment of the present invention will now be described with reference to the accompanying drawings.
[System Configuration]

FIG. 1 is a schematic diagram illustrating the configuration of an internal combustion engine system that includes an exhaust emission control device according to the first embodiment of the present invention. An internal combustion engine 2 includes an intake path 4 for introducing air into a cylinder, and an exhaust path 6 in which an exhaust gas discharged from a cylinder flows. A catalyst 8, which can purify the exhaust gas, is installed in the exhaust path 6.

The system according to the present embodiment includes a bypass 10 that bypasses a part of the exhaust path 6. The bypass 10 branches off from the exhaust path 6 at an upstream joint 10a, which is positioned downstream of the catalyst 8, and joins the exhaust path 6 at a downstream joint 10b, which is positioned downstream of the upstream joint 10a. The upstream joint 10a is provided with a changeover valve 12, which switches an exhaust gas flow destination between the exhaust path 6 and the bypass 10.

An NOx adsorbent 14, which is capable of adsorbing NOx contained in the exhaust gas, is installed in the middle of the bypass 10. Metal ion exchange zeolite, such as Fe ion exchange zeolite, may be used as the NOx adsorbent 14. A water sensor 22 and an NOx sensor 24 are installed in the bypass 10 and positioned upstream of the NOx adsorbent 14 (positioned toward the upstream joint 10a). In addition, a water sensor 26 and an NOx sensor 28 are installed downstream of the NOx adsorbent (positioned toward the downstream joint 10b).

Between the upstream joint 10a and the NOx adsorbent 14 is a return path 16 that communicates with the bypass 10. The return path 16 has a purge control valve 18 installed in its midst, and the other end of the return path 16 communicates with the intake path 4.

The system according to the present embodiment includes an ECU (Electronic Control Unit) 20, which controls the operation of the system. The ECU 20 is connected to the water sensors 22, 26, NOx sensors 24, 28, and various other sensors for controlling the internal combustion engine 2. The ECU 20 is also connected to the changeover valve 12, purge control valve 18, and various other actuators.
[System Operation]

Operations performed by the system controlled by the ECU 20 will now be described. Although various operations are performed by the system, the following description deals with operations related to the NOx adsorbent 14.
(Operation Performed on a Cold Start-Up)

When the internal combustion engine 2 cold-starts, the system performs an operation so that the NOx adsorbent 14 adsorbs NOx in the exhaust gas discharged from a cylinder. More specifically, the changeover valve 12 switches the exhaust gas flow destination to the bypass 10. In addition, control is exercised to close the purge control valve 18.

In the resulting state, the entire exhaust gas emitted from the internal combustion engine is introduced from the exhaust path 6 to the bypass 10. The exhaust gas introduced into the bypass 10 passes through the NOx adsorbent 14, returns to the exhaust path 6, and is released to the atmosphere. Because the catalyst 8 is not activated immediately after a cold start-up, the catalyst 8 cannot purify NOx that is contained in the exhaust gas. However, when the entire exhaust gas is introduced into the bypass 10, the NOx contained in the exhaust gas is removed by being adsorbed by the NOx adsorbent 14. This ensures that the NOx which is not purified by the catalyst 8 will not be released to the atmosphere.

The exhaust gas emitted from the internal combustion engine 2 contains water that is generated during fuel combustion. Zeolite, which is used as a material for the NOx adsorbent 14, is also capable of adsorbing water. Therefore, when the entire exhaust gas is introduced into the bypass 10, the NOx adsorbent 14 adsorbs not only the NOx but also the water contained in the exhaust gas.
(Operation Performed after a Catalyst Warm-Up)

After the internal combustion engine startup, the temperature of the exhaust gas flowing into the catalyst 8 rises so that the catalyst 8 is heated to its activation temperature. After activated, the catalyst 8 can purify the NOx contained in the exhaust gas as well as other unpurified components. Consequently, when it is detected that the catalyst 8 is heated to its activation temperature, the changeover valve 12 operates to switch the exhaust gas flow destination from the bypass 10 to the exhaust path 6. This ensures that the exhaust gas purified by the catalyst 8 is released to the atmosphere through the exhaust path 6 without passing through the NOx adsorbent 14.

Then, when predefined purge start conditions are met, the purge control valve 18 opens. Consequently, a negative pressure generated in the intake path 4 of the internal combustion engine 2 is used so that part of the exhaust gas discharged from a cylinder is introduced from the exhaust path 6 through the downstream joint 10b to the bypass 10.

As a result, a high-temperature exhaust gas is supplied to the NOx adsorbent 14. NOx and water are adsorbed by the NOx adsorbent 14 when the exhaust gas is at a relatively low temperature. At a high temperature, however, NOx and water are desorbed from the NOx adsorbent 14. Therefore, when the high-temperature exhaust gas is introduced into the NOx adsorbent 14, the adsorbed NOx and water become desorbed from the NOx adsorbent 14. The desorbed NOx and water are then introduced into the intake path 4 through the return path 16. The NOx returned to the intake path 4 is burned again and then purified by the catalyst 8, which is now active. The water is released as it is to the atmosphere through the exhaust path 6.

[Performance Diagnosis of the NOx Adsorbent]

The ECU 20 incorporates a diagnosis function for evaluating the NOx adsorption performance of the NOx adsorbent 14 as a part of system OBD functionality. This diagnosis function is exercised to let the ECU 20 judge whether the degradation of NOx adsorption performance is temporary or permanent. Temporary performance degradation is performance degradation (due to oxidation) that can be recovered by exposing the NOx adsorbent 14 to a reductive atmosphere, whereas permanent performance degradation is an unrecoverable decrease in the performance that is caused by the deterioration of the adsorptive material. When the performance of the NOx adsorbent 14 is temporarily degraded, this diagnosis function is exercised to evaluate the degree of such performance degradation.

(Overview of Performance Diagnosis)

Figure 2:
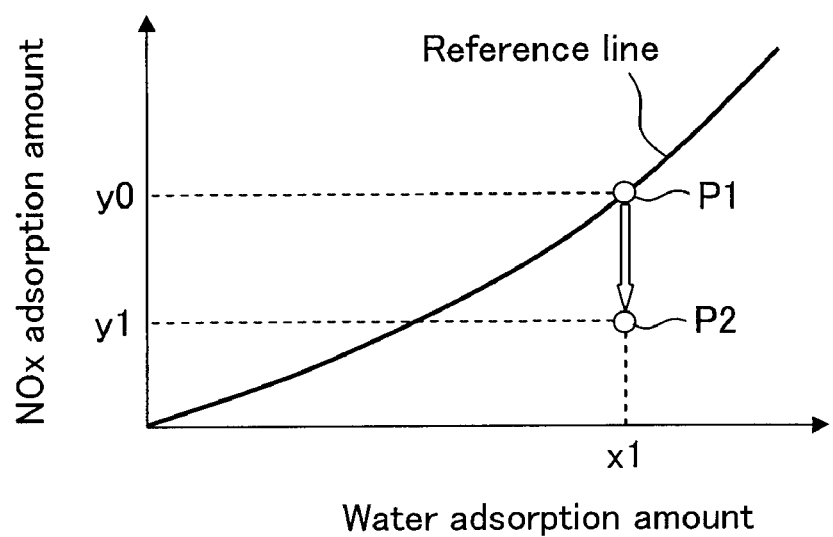
FIG. 2 shows a correlation between a water adsorption amount and an NOx adsorption amount that prevails when a brand-new NOx adsorbent is used.

First of all, performance diagnosis of the NOx adsorbent 14 that is performed in accordance with the present embodiment will be outlined. FIG. 2 shows a correlation between a water adsorption amount and an NOx adsorption amount that prevails when a brand-new NOx adsorbent 14 is used. The figure indicates that the NOx adsorption amount can be expressed as a function of the water adsorption amount when a brand-new NOx adsorbent 14 is used. The performance of the NOx adsorbent 14 may degrade due to the deterioration of its adsorptive material. However, the correlation between the water adsorption amount and the NOx adsorption amount is maintained even when such permanent performance degradation is encountered. More specifically, the NOx adsorption amount and water adsorption amount decrease as indicated by the curve (hereinafter referred to as the reference line) shown in FIG. 2 when the NOx adsorption performance is permanently degraded due to deterioration.

When, on the other hand, the NOx adsorption performance is temporarily degraded due to oxidation, the NOx adsorption amount is smaller than when a brand-new NOx adsorbent is used; however, the water adsorption amount remains unchanged. The reason is that oxidation only affects NOx adsorption performance, not water adsorption performance. When, for instance, the adsorption performance of the NOx adsorbent 14 is temporarily degraded due to oxidation in a situation where the initial state (brand-new state) of the NOx adsorbent 14 is represented by point P1 in FIG. 2, the relationship between the water adsorption amount and NOx adsorption amount shifts to point P2, which is positioned away from the reference line.

Consequently, whether the NOx adsorption performance is degraded temporarily or permanently can be determined by measuring the water adsorption amount and NOx adsorption amount and checking whether the measured values are on the reference line. In addition, the degree of temporary NOx adsorption performance degradation can be objectively evaluated by measuring the degree of deviation of the measured values from the reference line (the length of the arrow in FIG. 2).

(Details of Performance Diagnosis Procedure)

A procedure for diagnosing the performance of the NOx adsorbent 14 will now be described in detail. The performance diagnosis procedure is performed when predefined diagnosis start conditions are met. The diagnosis start conditions include whether purging NOx and water from the NOx adsorbent 14 is complete and whether the NOx adsorbent 14 is ready to adsorb NOx and water due to a low exhaust gas temperature.

When the diagnosis start conditions are met, the changeover valve 12 switches the exhaust gas flow destination to the bypass 10. In addition, control is exercised to close the purge control valve 18. The changeover valve 12 operates so that an exhaust gas containing NOx and water is introduced into the NOx adsorbent 14. After the changeover valve 12 is operated, the ECU 20 starts measuring the NOx adsorption amount and water adsorption amount of the NOx adsorbent 14. The NOx adsorption amount and water adsorption amount are measured in the manner described below.

Figure 3:
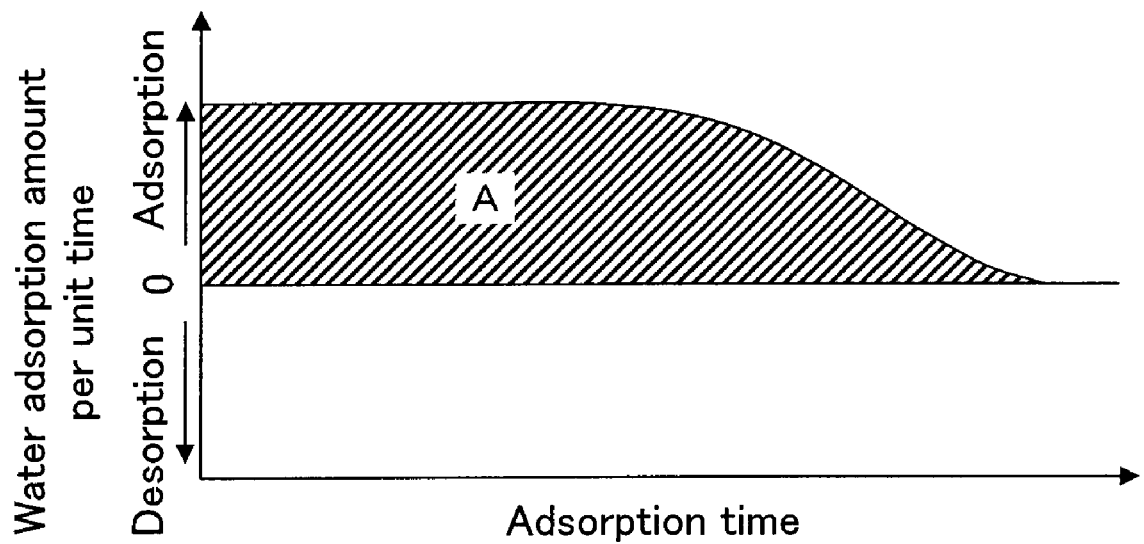
FIG. 3 shows a graph that represents time change of the water adsorption amount per unit time.

First of all, the water adsorption amount of the NOx adsorbent 14 is measured by the water sensors 22, 26, which are positioned upstream and downstream of the NOx adsorbent 14, respectively. The horizontal axis of a graph shown in FIG. 3 represents time, whereas the vertical axis represents the water adsorption amount per unit time. An output value generated from the upstream water sensor 22 corresponds to the amount of water flowing into the NOx adsorbent 14. An output value generated from the downstream water sensor 26 corresponds to the amount of water flowing out of the NOx adsorbent 14. Therefore, the water adsorption amount per unit time, which is shown in FIG. 3, corresponds to the output value deviation between the upstream water sensor 22 and the downstream water sensor 26. When the water adsorption amount of the NOx adsorbent 14 is increased to saturation, the output value deviation between the two water sensors 22, 26 is reduced to zero. Therefore, the water adsorption amount x1 of the NOx adsorbent 14 can be determined by integrating the obtained output value deviation between the water sensors 22, 26, that is, by calculating the area of shaded portion A in FIG. 3.

Figure 4:
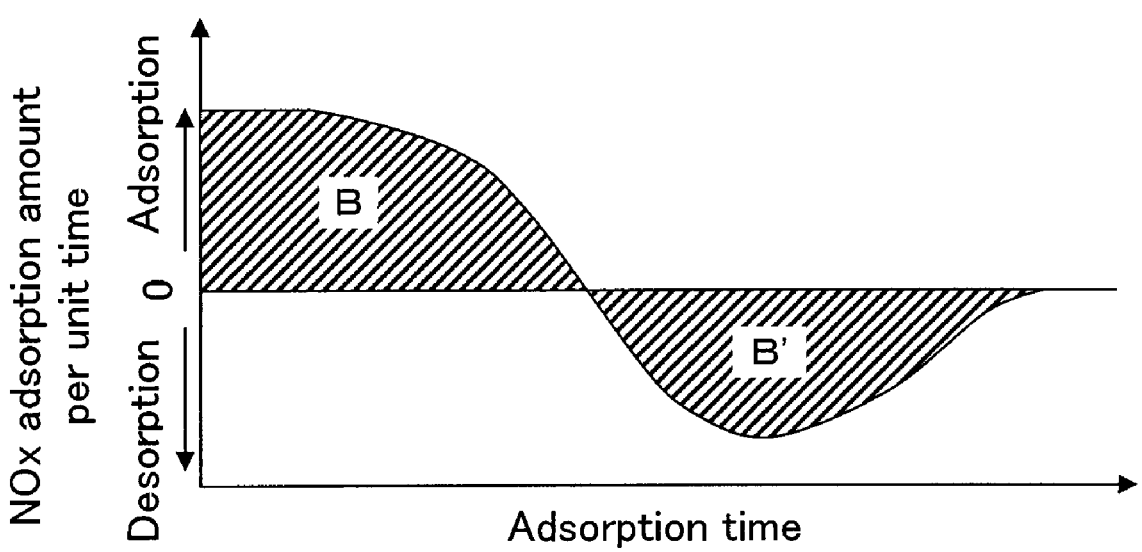
FIG. 4 shows a graph that represents time change of the NOx adsorption amount per unit time.

Meanwhile, the NOx adsorption amount of the NOx adsorbent 14 is measured by the NOx sensors 24, 28, which are positioned upstream and downstream of the NOx adsorbent 14, respectively. The horizontal axis of a graph shown in FIG. 4 represents time, whereas the vertical axis represents the NOx adsorption amount per unit time. An output value generated from the upstream NOx sensor 24 corresponds to the amount of NOx flowing into the NOx adsorbent 14. An output value generated from the downstream water sensor 28 corresponds to the amount of NOx flowing out of the NOx adsorbent 14. Therefore, the NOx adsorption amount per unit time, which is shown in FIG. 4, corresponds to the output value deviation between the upstream NOx sensor 24 and the downstream NOx sensor 28.

The NOx adsorbed by the NOx adsorbent 14 is desorbed by the action of later-adsorbed water. Therefore, the output value deviation between the two NOx sensors 24, 28 remains to be a positive value for a certain period of time after the start of adsorption. However, the amount of NOx desorbed by the action of water becomes larger than the adsorption amount before long. Consequently, the output value deviation between the two NOx sensors 24, 28 changes to a negative value. Eventually, when the entire NOx is desorbed, the output value deviation between the NOx sensors 24, 28 converges to zero.

In consideration of the above-described adsorption characteristics of the NOx adsorbent 14, the present embodiment integrates the output value deviation between the two NOx sensors 24, 28 until it changes from a positive value to a negative value. In other words, the present embodiment calculates the area of shaded portion B in FIG. 4. The area of shaded portion B represents the maximum NOx adsorption amount of the NOx adsorbent 14. The present embodiment calculates the maximum NOx adsorption amount as the NOx adsorption amount y1 of the NOx adsorbent.

As the NOx adsorbed by the NOx adsorbent 14 becomes desorbed entirely, the area of shaded portion B', which indicates the amount of NOx desorbed from the NOx adsorbent, is equal to the area of shaded portion B. Therefore, an alternative is to integrate the output value deviation between the NOx sensors 24, 28 during the time interval between the instant at which the output value deviation changes to a negative value and the instant at which it reverts to zero, and use the calculated integral as the NOx adsorption amount y1.

The ECU 20 stores map data that corresponds to the reference line shown in FIG. 2. When the water adsorption amount is measured, the map data is accessed to read an NOx adsorption amount on the reference line that corresponds to the measured value x1 (this NOx adsorption amount is hereinafter referred to as the reference NOx adsorption amount y0). The measured NOx adsorption amount y1 is then compared against the reference NOx adsorption amount y0 to calculate the deviation $\Delta y$ between them ($\Delta y = y0 - y1$).

The performance of the NOx adsorbent 14 is diagnosed in accordance with the NOx adsorption amount deviation $\Delta y$ and the measured water adsorption amount x1. When the NOx adsorption amount deviation $\Delta y$ is not zero, that is, when the measured result is not on the reference line, it is diagnosed that the NOx adsorption performance of the NOx adsorbent 14 is temporarily degraded. The greater the NOx adsorption amount deviation $\Delta y$, the higher the diagnosed degree of temporary NOx adsorption performance degradation.

Meanwhile, the measured water adsorption amount x1 is used for the diagnosis of deterioration. The smaller the measured water adsorption amount x1, the higher the diagnosed degree of permanent performance degradation of the NOx adsorbent 14.

The above diagnosis is reflected in the next operation of the system. If the NOx adsorption performance of the NOx adsorbent 14 is temporarily degraded, a predetermined performance recovery process is performed. The performance recovery process is performed by supplying a reductant-containing gas to the NOx adsorbent 14. The method of supplying such a gas is not limited. For example, the air-fuel ratio of the internal combustion engine 2 may be controlled to be richer than the stoichiometric one. The higher the degree of temporary NOx adsorption performance degradation, that is, the greater the NOx adsorption amount deviation $\Delta y$, the larger the amount of reductant supplied to the NOx adsorbent 14.

In the embodiment described above, the "water adsorption amount measurement means" according to the first aspect of the present invention is implemented when the ECU 20 calculates the water adsorption amount x1 from the output values of the water sensors 22, 26; the "NOx adsorption amount measurement means" according to the first aspect of the present invention is implemented when the ECU 20 calculates the NOx adsorption amount y1 from the output values of the NOx sensors 24, 28. Further, the capability of the ECU 20 to store the map data representing the reference line shown in FIG. 2 corresponds to the "reference value storage means" according to the first aspect of the present invention. Furthermore, the "comparison means" according to the first aspect of the present invention is implemented when the ECU 20 calculates the NOx adsorption amount deviation $\Delta y$. Moreover, the "signal output means" according to the first aspect of the present invention is implemented when the ECU 20 calculates the NOx adsorption amount deviation $\Delta y$ and the measured water adsorption amount x1 and converts them into a signal.

Second Embodiment

A second embodiment of the present invention will now be described with reference to the accompanying drawings.

[System Configuration]

Figure 5:
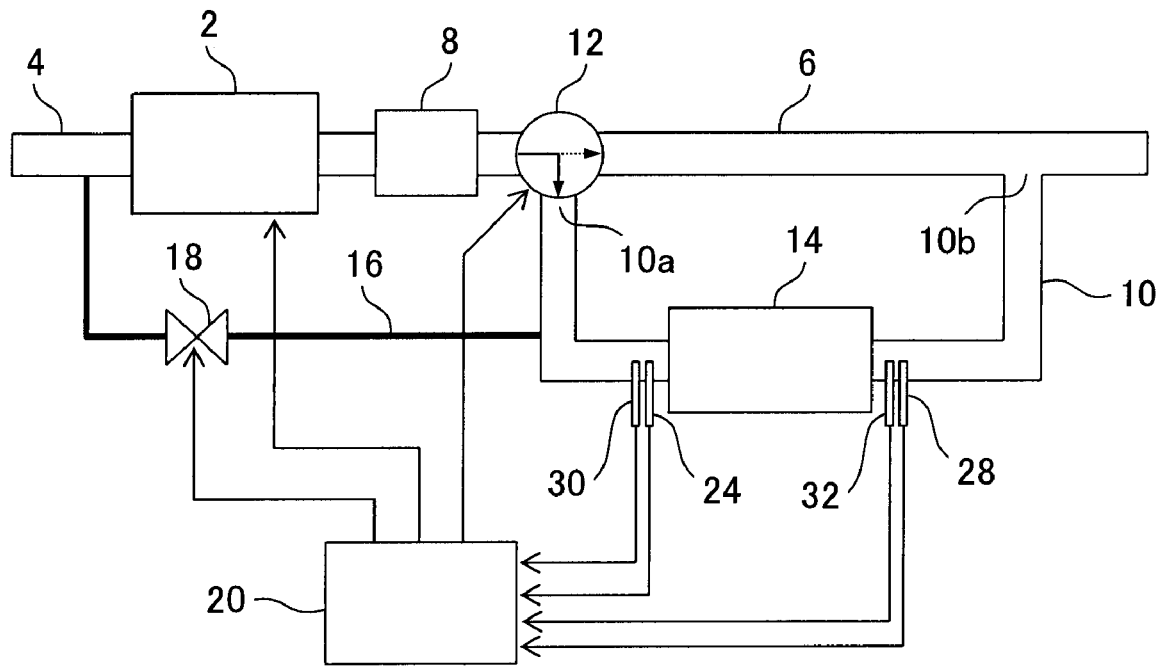
FIG. 5 is a schematic diagram illustrating the configuration of an internal combustion engine system that includes an exhaust emission control device according to a second embodiment of the present invention.

FIG. 5 is a schematic diagram illustrating the configuration of an internal combustion engine system that includes an exhaust emission control device according to the second embodiment of the present invention. Elements that are shown in FIG. 5 and identical with those of the system according to the first embodiment are assigned the same reference numerals as their counterparts, and their description will be simplified or omitted.

The system according to the second embodiment is characterized in that temperature sensors (thermocouples) are installed in place of the water sensors according to the first embodiment. More specifically, a temperature sensor 30 and the NOx sensor 24 are installed upstream of the NOx adsorbent 14 (positioned toward the upstream joint 10a), and a temperature sensor 32 and the NOx sensor 28 are installed downstream of the NOx adsorbent 14 (positioned toward the downstream joint 10b).

[Performance Diagnosis of NOx Adsorbent]

The system according to the second embodiment is characterized in that the output values of the temperature sensors 30, 32 are used to diagnose the performance of the NOx adsorbent 14. The second embodiment covers exactly the same performance diagnosis items as the first embodiment, and judges whether the adsorption performance of the NOx adsorbent 14 is degraded temporarily or permanently. Further, if the adsorption performance of the NOx adsorbent 14 is temporarily degraded, the second embodiment evaluates the degree of such temporary performance degradation.

(Overview of Performance Diagnosis)

First of all, performance diagnosis of the NOx adsorbent 14 that is performed in accordance with the present embodiment will be outlined. The NOx adsorbent 14 generates adsorption heat when it adsorbs water. The amount of generated adsorption heat is extremely highly correlated to the water adsorption amount of the NOx adsorbent 14. Therefore, the water adsorption amount of the NOx adsorbent 14 can be indirectly measured by measuring the amount of heat generated upon water adsorption. The present embodiment determines the amount of heat generated upon water adsorption, and diagnoses the performance of the NOx adsorbent 14 in accordance with the relationship between the determined amount of heat and the NOx adsorption amount.

Figure 6:
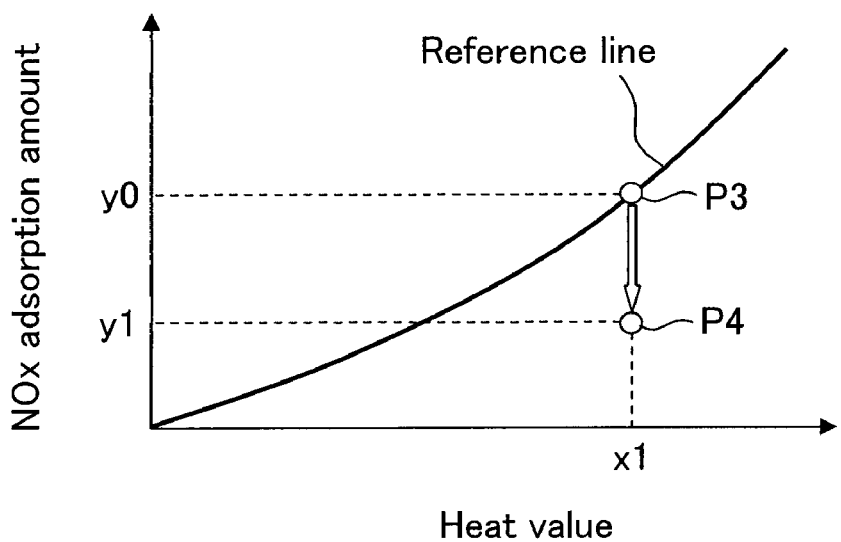
FIG. 6 shows a correlation between a heat value and an NOx adsorption amount that prevails when a brand-new NOx adsorbent is used.

FIG. 6 shows a correlation between a heat value (the amount of heat generated upon water adsorption) and an NOx adsorption amount that prevails when a brand-new NOx adsorbent 14 is used. The figure indicates that the NOx adsorption amount can be expressed as a function of the heat value when a brand-new NOx adsorbent 14 is used. The NOx adsorption amount and the heat value decrease as indicated by the curve (hereinafter referred to as the reference line) shown in FIG. 6 when the NOx adsorption performance is permanently degraded due to deterioration.

When, on the other hand, the NOx adsorption performance is temporarily degraded due to oxidation, the NOx adsorption amount is smaller than when a brand-new NOx adsorbent is used; however, the heat value remains unchanged. When, for instance, the adsorption performance of the NOx adsorbent 14 is temporarily degraded due to oxidation in a situation where the initial state (brand-new state) of the NOx adsorbent 14 is represented by point P3 in FIG. 6, the relationship between the amount of heat generated upon water adsorption and the NOx adsorption amount shifts to point P4, which is positioned away from the reference line.

Consequently, whether the NOx adsorption performance is degraded temporarily or permanently can be determined by measuring the amount of heat generated upon water adsorption and the NOx adsorption amount and checking whether the measured values are on the reference line. In addition, the degree of temporary NOx adsorption performance degradation can be objectively evaluated by measuring the degree of deviation of the measured values from the reference line (the length of the arrow in FIG. 6).

(Details of Performance Diagnosis Procedure)

A procedure for diagnosing the performance of the NOx adsorbent 14 will now be described in detail. The second embodiment is identical with the first embodiment in terms of the diagnosis start conditions, the system operation performed when the diagnosis start conditions are met, and the measurement of the NOx adsorption amount of the NOx adsorbent 14. The second embodiment differs from the first embodiment in that the former measures the amount of heat generated upon water adsorption instead of the water adsorption amount.

Figure 7:
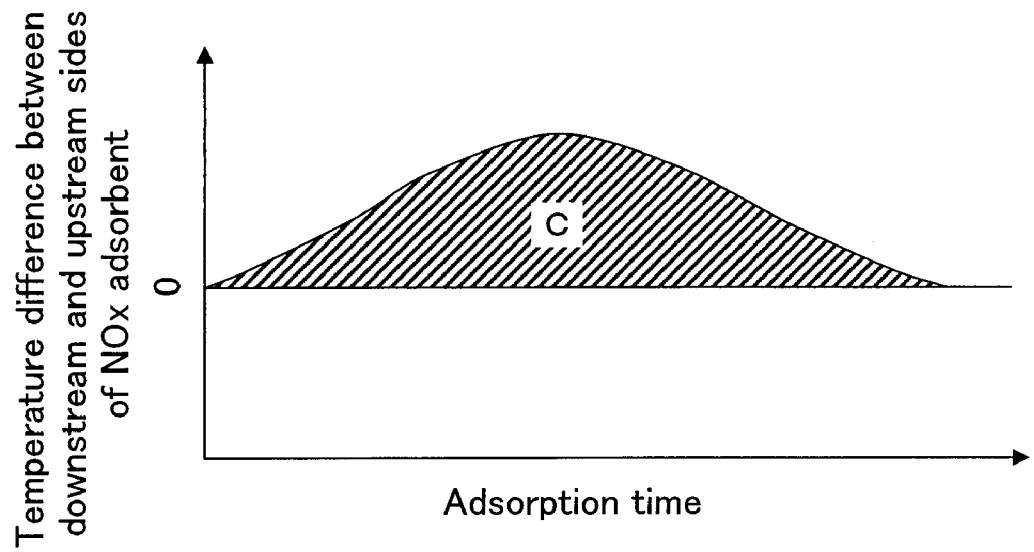
FIG. 7 shows a graph that represents time change of the temperature difference between the downstream and upstream sides of the NOx adsorbent.

The amount of heat generated when the NOx adsorbent 14 adsorbs water is measured by the temperature sensors 30, 32, which are positioned upstream and downstream of the NOx adsorbent 14, respectively. The horizontal axis of a graph shown in FIG. 7 represents time, whereas the vertical axis represents the output value difference between the downstream temperature sensor 32 and the upstream temperature sensor 30, that is, the temperature difference between the downstream and upstream sides of the NOx adsorbent 14. The temperature difference between the downstream and upstream sides of the NOx adsorbent 14 arises due to adsorption heat that is generated when the NOx adsorbent 14 adsorbs water. Therefore, the heat value x1, which is the amount of heat generated upon water adsorption, can be determined by integrating the temperature difference, that is, by calculating the area of shaded portion C in FIG. 7.

The ECU 20 stores map data that corresponds to the reference line shown in FIG. 6. When the heat value x1, which is the amount of heat generated upon water adsorption, is measured, the map data is accessed to read an NOx adsorption amount on the reference line that corresponds to the measured value x1 (this NOx adsorption amount is hereinafter referred to as the reference NOx adsorption amount y0). The measured NOx adsorption amount y1 is then compared against the reference NOx adsorption amount y0 to calculate the deviation $\Delta y$ between them ($\Delta y = y0 - y1$).

The performance of the NOx adsorbent 14 is diagnosed in accordance with the NOx adsorption amount deviation $\Delta y$ and the measured heat value x1. When the NOx adsorption amount deviation $\Delta y$ is not zero, that is, when the measured result is not on the reference line, the NOx adsorption performance of the NOx adsorbent 14 is diagnosed to be temporarily degraded. The greater the NOx adsorption amount deviation $\Delta y$, the higher the diagnosed degree of temporary NOx adsorption performance degradation. Meanwhile, the measured heat value x1 is used for the diagnosis of deterioration. The smaller the measured heat value x1, the higher the diagnosed degree of permanent performance degradation of the NOx adsorbent 14. The above diagnosis is reflected in the next operation of the system as is the case with the first embodiment.

In the embodiment described above, the "water adsorption amount measurement means" according to the first aspect of the present invention is implemented when the ECU 20 calculates the heat value x1, which is the amount of heat generated upon water adsorption, from the output values of the temperature sensors 30, 32; the "NOx adsorption amount measurement means" according to the first aspect of the present invention is implemented when the ECU 20 calculates the NOx adsorption amount y1 from the output values of the NOx sensors 24, 28. Further, the capability of the ECU 20 to store the map data representing the reference line shown in FIG. 6 corresponds to the "reference value storage means" according to the first aspect of the present invention. Furthermore, the "comparison means" according to the first aspect of the present invention is implemented when the ECU 20 calculates the NOx adsorption amount deviation $\Delta y$. Moreover, the "signal output means" according to the first aspect of the present invention is implemented when the ECU 20 calculates the NOx adsorption amount deviation $\Delta y$ and the measured heat value x1, that is, converts them into a signal.

Others

While the present invention has been described in terms of its preferred embodiments, it should be understood that the present invention is not limited to those preferred embodiments and can be practiced with modification within the spirit and scope of the appended claims. For example, the following modifications may be made to the preferred embodiments of the present invention.

(First Modification)

Figure 8:
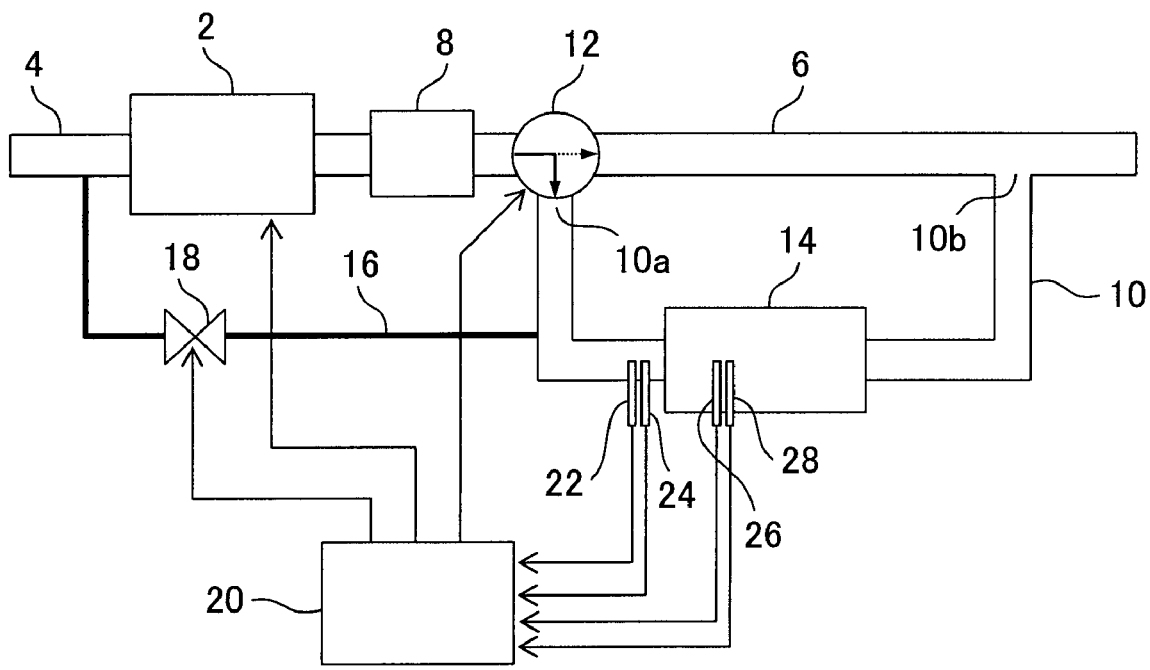
FIG. 8 shows an alternative position of the NOx sensor and water sensor in an internal combustion engine system.

In the system configuration shown in FIG. 1, the water sensor 26 and NOx sensor 28 are positioned downstream of the NOx adsorbent 14. However, the water sensor 26 and NOx sensor 28 may alternatively be positioned within the NOx adsorbent 14 as shown in FIG. 8. This alternative configuration works effectively in a situation where the adsorption capacity of the NOx adsorbent 14 is large so that the adsorption performance cannot be clearly confirmed if the sensors are positioned upstream and downstream of the NOx adsorbent 14. When this alternative configuration is employed, the range of adsorption performance diagnosis is limited to the front end of the NOx adsorbent 14. However, the performance of the front end is easily degraded due to oxidation and deterioration because it is the most frequently used part of the NOx adsorbent 14. Consequently, no problem arises even when the range of diagnosis is limited to the front end.

Further, in the configuration shown in FIG. 5, the water sensor 26 and the temperature sensor 32 may alternatively be positioned within the NOx adsorbent 14 (this alternative configuration is not shown). This alternative configuration also works effectively in a situation where the adsorption capacity of the NOx adsorbent 14 is large so that the adsorption performance cannot be clearly confirmed if the sensors are positioned upstream and downstream of the NOx adsorbent 14.

(Second Modification)

The upstream water sensor 22 and the NOx sensor 24 according to the first embodiment may be removed so as to estimate the flow rates of water and NOx flowing into the NOx adsorbent 14 in accordance with the operating conditions for the internal combustion engine 2. More specifically, the water and NOx flow rates may be estimated by creating a map that uses rotation speed, air-fuel ratio, ignition timing, and other operating conditions concerning an exhaust gas flow rate and an exhaust gas composition as parameters, and reading the water flow rate and NOx flow rate from the map in accordance with the operating conditions. An alternative is to confirm the water flow rate and NOx flow rate that prevail under specific operating conditions, and set the specific operating conditions as the internal combustion engine operating conditions for performance diagnosis.

(Third Modification)

In the second embodiment, the horizontal axis of the graph shown in FIG. 6 represents a heat value. However, the horizontal axis may alternatively represent a temperature parameter that is highly correlated to the water adsorption amount. For example, the maximum value of the temperature difference between the downstream and upstream sides of the NOx adsorbent 14, that is, the maximum height of shaded portion C in FIG. 7, may be represented by the horizontal axis of the graph shown in FIG. 6. Another alternative is to let the horizontal axis of the graph shown in FIG. 6 represent the rate of increase in the above-mentioned temperature difference.

(Fourth Modification)

In the first and second embodiments, the performance of the NOx adsorbent 14 may be diagnosed when the system performs a purge operation. When the purge operation is performed, NOx and water become desorbed from the NOx adsorbent 14. The amount of such NOx desorption can be determined from the output value deviation between the NOx sensors 24, 28, whereas the amount of such water desorption can be determined from the output value deviation between the water sensors 22, 26. The NOx adsorption amount and the water adsorption amount, which are necessary for performance diagnosis, can be obtained by determining the NOx adsorption amount and water desorption amount that are provided by the purge operation.

(Fifth Modification)

A reference body of the NOx adsorbent 14 that is related to the setting for the reference line shown in FIGS. 2 and 6 need not always be brand-new. An alternative is to prepare an NOx adsorbent 14 whose NOx adsorption performance is lowered to the extent that the NOx adsorbent 14 requires the predetermined performance recovery process, use the prepared NOx adsorbent 14 as the reference body, obtain a curve that represents the correlation between the water adsorption amount and NOx adsorption amount of the reference body, and set the obtained curve as the reference line. As far as the reference line is set up as described above, it can be concluded that the performance recovery process is unnecessary when the measured water adsorption amount and NOx adsorption amount are above the reference line, and necessary when the measured amounts are below the reference line.

The invention claimed is:

1. An exhaust emission control device for an internal combustion engine, the device comprising:
    an NOx adsorbent which is positioned in an exhaust path of the internal combustion engine;
    NOx adsorption amount measurement means for measuring the amount of NOx that is adsorbed by the NOx adsorbent while the internal combustion engine is in operation;
    water adsorption amount measurement means for measuring the amount of water that is adsorbed by the NOx adsorbent while the internal combustion engine is in operation;
    reference value storage means for storing a reference value of an NOx adsorption amount with respect to a water adsorption amount;
    comparison means for comparing a measured NOx adsorption amount against a reference value of the NOx adsorption amount with respect to a measured water adsorption amount; and
    signal output means for outputting a signal in which the result of the comparison is reflected.

2. The exhaust emission control device according to claim 1, wherein the signal output means outputs a signal representing the magnitude relationship between the measured value of the NOx adsorption amount and the reference value of the NOx adsorption amount that have been compared.

3. The exhaust emission control device according to claim 1, wherein the signal output means outputs a signal corresponding to the deviation between the measured value of the NOx adsorption amount and the reference value of the NOx adsorption amount that have been compared.

4. The exhaust emission control device according to claim 1, wherein the signal output means outputs not only a signal corresponding to the deviation between the measured value of the NOx adsorption amount and the reference value of the NOx adsorption amount that have been compared, but also a signal corresponding to the measured value of the water adsorption amount.

5. The exhaust emission control device according to claim 1, wherein the NOx adsorption amount measurement means includes an upstream NOx sensor, which is positioned upstream of the NOx adsorbent, and a downstream NOx sensor, which is positioned downstream of or within the NOx adsorbent, and calculates the NOx adsorption amount in accordance with the output value difference between the two NOx sensors.

6. The exhaust emission control device according to claim 1, wherein the water adsorption amount measurement means includes an upstream water sensor, which is positioned upstream of the NOx adsorbent, and a downstream water sensor, which is positioned downstream of or within the NOx adsorbent, and calculates the water adsorption amount in accordance with the output value difference between the two water sensors.

7. The exhaust emission control device according to claim 1, wherein the water adsorption amount measurement means includes an upstream temperature sensor, which is positioned upstream of the NOx adsorbent, and a downstream temperature sensor, which is positioned downstream of or within the NOx adsorbent, and calculates the water adsorption amount in accordance with the output value difference between the two temperature sensors.

8. A performance diagnosis method for an NOx adsorbent, comprising the steps of:
    preparing data representing the correlation between a water adsorption amount and NOx adsorption amount of a reference body, the reference body being a non-degraded NOx adsorbent;
    supplying a gas containing NOx and water to a diagnosis target body, the diagnosis target body being a NOx adsorbent to be diagnosed, and measuring the amounts of NOx and water adsorbed by the diagnosis target body;
    referencing the data to determine the NOx adsorption amount of the reference body (hereinafter referred to as the reference NOx adsorption amount) that corresponds to a measured water adsorption amount, and comparing a measured NOx adsorption amount against the reference NOx adsorption amount; and
    judging the degree of temporary NOx adsorption performance degradation of the diagnosis target body in accordance with the result of the comparison.

9. An exhaust emission control device for an internal combustion engine, the device comprising:
- an NOx adsorbent which is positioned in an exhaust path of the internal combustion engine;
- an NOx adsorption amount measurement apparatus for measuring the amount of NOx that is adsorbed by the NOx adsorbent while the internal combustion engine is in operation;
- a water adsorption amount measurement apparatus for measuring the amount of water that is adsorbed by the NOx adsorbent while the internal combustion engine is in operation;
- a reference value storage apparatus for storing a reference value of an NOx adsorption amount with respect to a water adsorption amount;
- a comparison apparatus for comparing a measured NOx adsorption amount against a reference value of the NOx adsorption amount with respect to a measured water adsorption amount; and
- a signal output apparatus for outputting a signal in which the result of the comparison is reflected.

* * * * *